United States Patent
Kraus et al.

(10) Patent No.: US 7,068,525 B2
(45) Date of Patent: Jun. 27, 2006

(54) METHOD OF OPERATING MULTIPLE PARALLEL-CONNECTED PULSE-CONTROLLED INVERTERS

(75) Inventors: Ludwig Kraus, Ruhstorf/Rott (DE); Tobias Mehl, Neuhaus (DE)

(73) Assignee: Loher GmbH, Ruhstorf (DE)

( * ) Notice: Subject to any disclaimer, the term of this patent is extended or adjusted under 35 U.S.C. 154(b) by 0 days.

(21) Appl. No.: 10/730,396

(22) Filed: Dec. 8, 2003

(65) Prior Publication Data

US 2005/0047182 A1 Mar. 3, 2005

(30) Foreign Application Priority Data

Dec. 6, 2002 (DE) .................................. 102 57 210
May 5, 2003 (DE) .................................. 103 19 969

(51) Int. Cl.
*H02M 7/00* (2006.01)
(52) U.S. Cl. ....................................................... 363/71
(58) Field of Classification Search ................. 363/71, 363/72
See application file for complete search history.

(56) References Cited

U.S. PATENT DOCUMENTS

| | | | | |
|---|---|---|---|---|
| 5,253,156 A | * | 10/1993 | Sakurai et al. | 363/98 |
| 5,450,309 A | | 9/1995 | Rohner | |
| 5,657,217 A | * | 8/1997 | Watanabe et al. | 363/71 |
| 6,285,571 B1 | * | 9/2001 | Brooks et al. | 363/65 |
| 6,297,977 B1 | | 10/2001 | Huggett et al. | |
| 6,411,529 B1 | * | 6/2002 | Svensson | 363/35 |
| 6,831,442 B1 | * | 12/2004 | Hsu et al. | 318/803 |

FOREIGN PATENT DOCUMENTS

| | | |
|---|---|---|
| DE | 4038869 | 8/1991 |
| EP | 0524398 | 1/1993 |
| EP | 0582415 | 2/1994 |
| GB | 2295508 | 5/1996 |

* cited by examiner

*Primary Examiner*—Shawn Riley
(74) *Attorney, Agent, or Firm*—Dilworth & Barrese LLP

(57) ABSTRACT

Multiple parallel-connected pulse-controlled inverters (1,2) are operated by regulating individual current(s) of the pulse-controlled inverters (1, 2) or a number reduced by 1 (n−1) of the pulse-controlled inverters (1,2).

16 Claims, 3 Drawing Sheets

Circuit diagram providing an example of a parallel-connected circuit for two single-phase pulse-controlled inverters with IGBTs, free-wheeling diodes, and output chokes

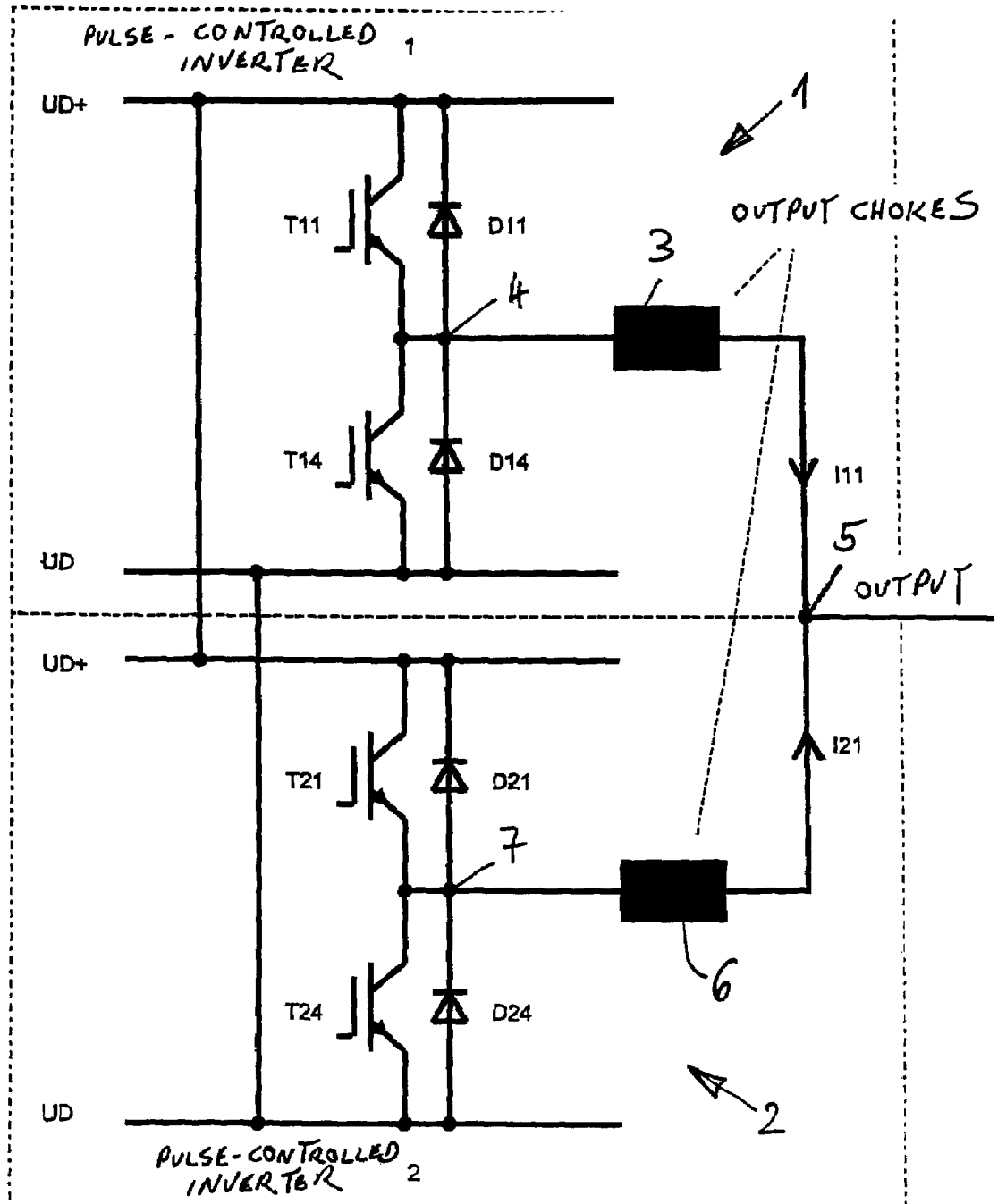
FIG. 1 CIRCUIT DIAGRAM PROVIDING AN EXAMPLE OF A PARALLEL-CONNECTED CIRCUIT FOR TWO SINGLE-PHASE PULSE-CONTROLLED INVERTERS WITH IGBTs, FREE-WHEELING DIODES, AND OUTPUT CHOKES

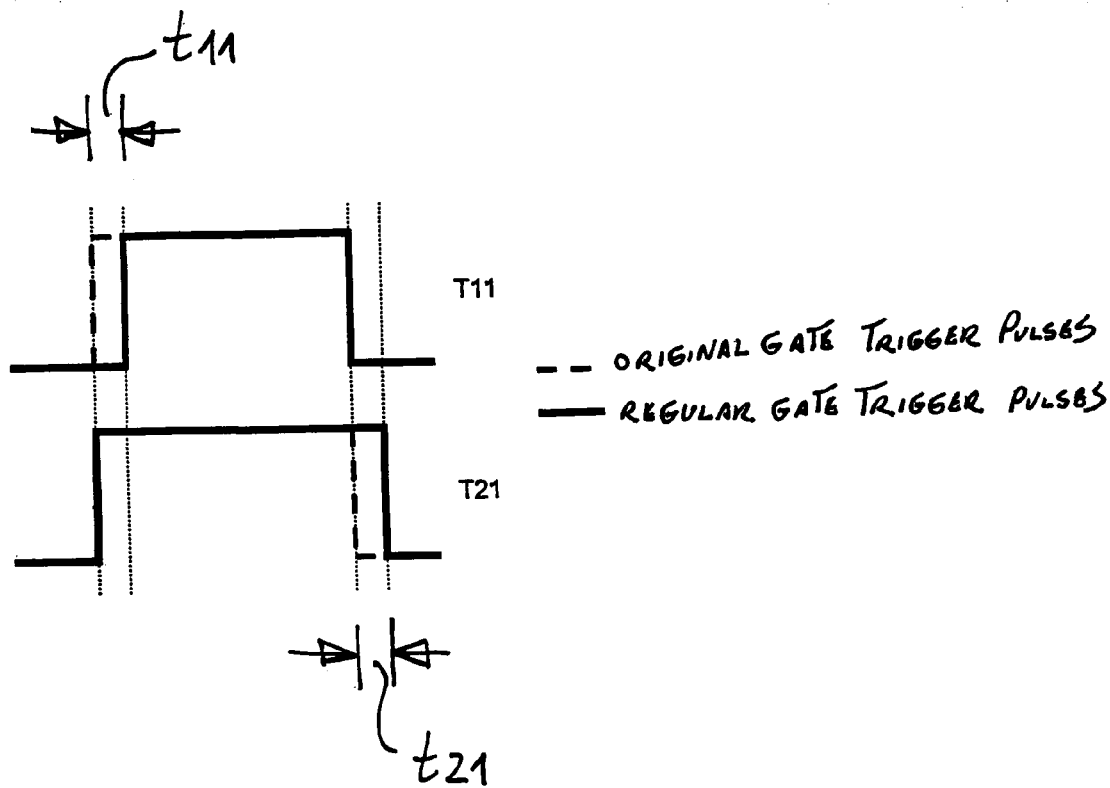
FIG 2 GATE TRIGGER PULSES

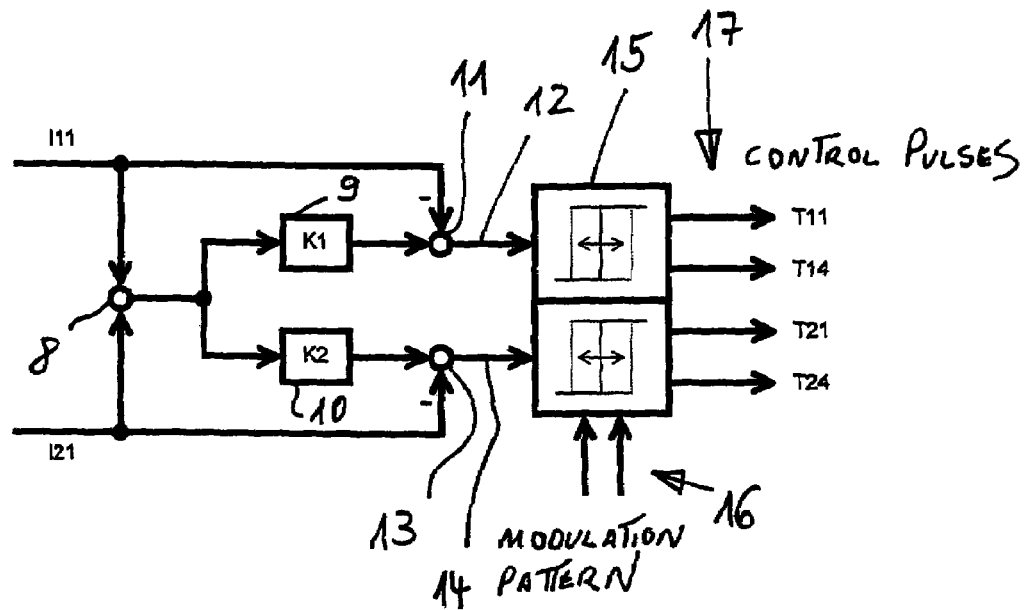
FIG. 3  BLOCK DIAGRAM OF THE REGULATION METHOD

METHOD OF OPERATING MULTIPLE PARALLEL-CONNECTED PULSE-CONTROLLED INVERTERS

BACKGROUND OF THE INVENTION

The invention relates to a method of operating multiple parallel-connected pulse-controlled inverters. Pulse-controlled inverters with voltage links and gate-turn-off power semiconductors, specifically, thyristors or IGBTs[1], are known in prior art. The method may be employed to operate two or more parallel-connected pulse-controlled inverters.

Parallel connection of two or more pulse-controlled inverters provides advantages when compared to the operation of a single pulse-controlled inverter. Parallel connection allows a higher output power to be obtained without a significant additional developmental effort. In addition, the use of two or more parallel-connected pulse-controlled inverters, specifically the use of a modular design, enables a redundant system to be created which is able to continue operating even in the event of a failure on the part of one of the pulse-controlled inverters—although with a possible reduction in output performance. The approach also provides cost savings since only the defective pulse-controlled inverter, not the entire system, has to be replaced in the event of such a failure.

SUMMARY OF THE INVENTION

The goal of the invention is therefore to propose an improved method of operating multiple parallel-connected pulse-controlled inverters.

This goal is achieved according to the invention be regulating the individual currents of the pulse-controlled inverters, or a given number of pulse-controlled inverters reduced by 1. The regulation method may be implemented by an approach which regulates each individual current of each pulse-controlled inverter. An approach is also possible whereby only the individual currents of the n–1 parallel-connected pulse-controlled inverters are regulated.

[1] Translator's note: original acronym corrected here (to conform to the correct usage below).

Advantageous modifications of the invention are described in the subclaims.

The method may be implemented using two pulse-controlled inverters. It is possible here to regulate one or both of the pulse-controlled inverters. However, the method may also be implemented using more than two pulse-controlled inverters.

The parallel-connected pulse-controlled inverters may be inverters having the same power output and/or inverters of random (different) power output. The distribution of power/current between the pulse-controlled inverters may be uniform and/or random (different). In the case of certain applications, however, it may be advantageous that the pulse-controlled inverters have the same output. The method may also be implemented such that a combination of pulse-controlled inverters of randomly different output and/or of the same output are employed. In addition, it is possible that the method comprise a random distribution of individual currents, or also a uniform distribution of the individual currents—regardless of whether the pulse-controlled inverters have the same output or a randomly different output.

The total current may be randomly distributed among the pulse-controlled inverters. In certain cases, however, it may be advantageous to distribute the total current to pulse-controlled inverters of the same output.

Preferably, each pulse-controlled inverter is regulated separately.

An advantageous modification of the invention is characterized in that the input variable of regulation is provided by the difference between the setpoint value and actual value of each output current, and by the modulation pattern.

It is advantageous if the control edges of the power semiconductors are shifted in the pulse-controlled inverter (s).

Preferably, each phase of one or of a multiple number of all pulse-controlled inverters are regulated individually.

Another advantageous modification of the invention is characterized in that the gain factor for regulation is a function of external limiting parameters.

The regulation method according to the invention allows multiple pulse-controlled inverters to be connected in parallel and the individual currents to be regulated, preferably, by a predefined shift in the relevant control edges. In principle, the individual currents are freely selectable; the only limiting condition is that their sum is equal to the total current. A possible application consists in distributing the total current among a number of parallel-connected pulse-controlled inverters. Preferably, the total current is distributed among a number of parallel-connected pulse-controlled inverters of the same output.

The regulation of each pulse-controlled inverter may occur separately. The input variables used are preferably the difference between the setpoint value and actual value of the relevant output current, and a modulation pattern, preferably, the pattern generated by the master control or regulation system. When pulse-controlled inverters of equal output are used, the mean value of the individual currents may be used as the setpoint value.

It is possible to individually regulate each phase of one, multiple, or of all the pulse-controlled inverters. In the case of two parallel-connected three-phase pulse-controlled inverters, the number of regulators thus totals six. The output variable of the regulator may then determine the shift in the control edges of the gate-turn-off power semiconductors employed.

The regulation method may also be implemented in such a way that one of the parallel-connected pulse-controlled inverters is not regulated. The method works even in this case. The method may be implemented in such a way that the currents are adjusted in one or the other pulse-controlled inverter according to the current distribution. Since total current is independent of this regulation, the current in the unregulated pulse-controlled inverter thus adjusts automatically as the difference between the total current and the sum of the regulated currents. The total current does not have to remain unchanged. It may, for example, be sinusoidal.

In prior-art approaches, the parallel-connected circuit in pulse-controlled inverters is constructed without additional regulation. As a result, however, the system must be significantly oversized. It is also necessary to specially select the power semiconductors. Despite these measures, simultaneously driving the modules may cause a current distribution to occur—due to tolerances, heating, different signal delay times, etc.—which results in an overload of the individual pulse-controlled inverters.

The regulation method according to the invention provides the advantage that any current distribution desired may be regulated in the individual pulse-controlled inverters. A uniform distribution is thus possible. At the same time, the method allows the system to react during operation to different limiting conditions, such as different temperatures, signal delay times, etc.

BRIEF DESCRIPTION OF THE DRAWINGS

The following discussion explains an embodiment of the invention in more detailed based on the attached drawings.

FIG. 1 is a circuit diagram of a parallel-connected circuit for two single-phase pulse-controlled inverters with IGBTs, freewheeling diodes, and output chokes;

FIG. 2 shows the time variation for gate trigger pulses; and

FIG. 3 is a block diagram of the regulation method.

DESCRIPTION OF THE PREFERRED EMBODIMENTS

Since regulation occurs independently of the phase number of the pulse-controlled inverter, it is described below using the example of one phase. To ensure explanatory transparency, the conditions described are those of a parallel-connected circuit of two pulse-controlled inverters of the same output which are constructed using IGBTs and appropriate freewheeling diodes.

In FIG. 1, a first single-phase pulse-controlled inverter 1 is connected in parallel with a second single-phase pulse-controlled inverter 2. First pulse-controlled inverter 1 comprises a first IGBT T11 and a second IGBT T14, which are connected in series and are located between the forward voltage UD+ and reverse voltage UD−. One diode each D11 and D14 are connected in parallel with IGBTs T11 and T14, specifically, in the direction from UD− to UD+. An output choke 3 is located between the interconnection point 4 of T11/D11 and T14/D14, and the output 5. Second pulse-controlled inverter 2 is of analogous design and includes two series-connected IGBTs T21 and T24 between UD+ and UD−, and two parallel-connected diodes D21 and D24 in the direction UD− to UD+. the second output choke 6 is located between the interconnection point 7 of T21/D21 and T24/D24, and output 5. The first current I11 flows from first output choke 3 to output 5. The second output current I21 flows from second output choke 6 to output 5.

The regulation method is implemented in the following manner: When the actual value of current I11 is greater than the setpoint value, the turn-on edge of T11 and turn-off edge of T14 are each delayed. The turn-off edge of T11 and turn-on edge of T14 remain undelayed. When the actual value of current I11 is smaller than the setpoint value, the turn-on edge of T11 and turn-off edge of T14 are undelayed. The turn-off edge of T11 and turn-on edge of T14 are each delayed.

The conditions for pulse-controlled inverter 2 are analogous. When the actual value of current I21 is greater than the setpoint value, the turn-on edge of T21 and turn-off edge of T24 are each delayed. The turn-off edge of T21 and turn-on edge of T24 each remain undelayed. When the actual value of I21 is smaller than the setpoint value, the turn-on edge of T21 and turn-off edge of T24 remain undelayed. The turn-off edge of T21 and the turn-on edge of T24 are each delayed.

Whenever the actual value of current I11 equals the setpoint value, the turn-on edges of T11 and T14, and the turn-off edges of T11 and T14 are each undelayed. Analogously, the turn-on edges of T21 and T24, and turn-off edges of T21 and T24 each remain undelayed whenever the actual value of current I21 equals the setpoint value.

The following table summarizes the above explanation. It indicates under which conditions the trigger signals for the pulse-controlled inverters considered here change relative to the signals of the modulation pattern generated by the master system. The table is the same for both pulse-controlled inverters:

| Current, pulse-controlled inverter (I11 or I21) | Turn-on edge T11 or T21<br>Turn-off edge T14 or T24 | Turn-off edge T11 or T21<br>Turn-on edge T14 or T24 |
| --- | --- | --- |
| actual value > setpoint value | delayed | undelayed |
| actual value = setpoint value | undelayed | undelayed |
| actual value < setpoint value | undelayed | delayed |

In the case of asymmetrical distribution of current, the two pulse-controlled inverters have setpoint/actual-value deviations of opposite polarity.

As a result of the operation of the regulators, the switching edges or control edges are shifted relative to the original modulation pattern in accordance with the above table.

FIG. 2 shows the gate trigger pulses for IGBTs T11 and T21 in the event of an excessively large current I11 and excessively small current I21. Since the actual value of current I11 is greater than the setpoint value, the turn-on edge of T11 is delayed by time t11. The turn-off edge of T11 remains undelayed. Since the actual value of current I21 is smaller than the setpoint value, the turn-on edge of T21 remains undelayed. The turn-off edge of T21 is delayed by time t21. Time intervals t11 and t21 may be of equal duration.

The different switching time points for the pulse-controlled inverters produce a voltage-time integral at the output chokes. The result is a change in current in the two chokes in the direction of removing the setpoint/actual-value deviation; the total current remains unchanged.

FIG. 3 provides an associated block diagram showing the regulation method for the example described of two parallel-connected pulse-controlled inverters. Actual values I11 and I21 are summed in a summing element 8. The sum is sent to amplifiers 9 and 10 where it is amplified by the factors K1 and K2. The output of amplifier 9 is fed to the differentiating element 11 in which the difference 12 is taken between the output value of amplifier 9 and actual current I11. The output of amplifier 10 is fed to the differentiating element 13 in which the difference 14 is taken between the output value of amplifier 10 and actual current I21.

Differences 12 and 14 are fed to the regulator 15 to which the modulation pattern 16 is also supplied. The regulator generates control pulses 17 for IGBTs T11, T14, T21, T24, specifically in the manner described involving a shift in the turn-on edges or turn-off edges.

Factors K1 and K2 may be constant. They may be of equal size. However, it is also possible that factors K1 and K2 not be constant. In this case, the regulation method has the ability to react during operation to changing conditions of the environment. For example, it is possible to include the temperature of the individual power semiconductors (IGBTs) in the generation of the setpoint value. Factors K1 and K2 are then temperature-dependent, specifically, in such a way that less current is applied to overheated power semiconductors.

The invention provides for the implementation of a regulation method for connecting pulse-controlled inverters in parallel through output chokes, wherein the modulation pattern is generated in a voltage-controlled manner by a master control system and is corrected in a partial-current-dependent manner within a separate lower-level control unit for each pulse-controlled inverter. The voltages and currents of the parallel-connected pulse-controlled inverters may be randomly selected, whereby it is possible, specifically, to parallel-connect even pulse-controlled inverters with different power outputs. The pulse frequency rate may range between 500 Hz and 20 kHz. It is possible for a partial-current-dependent correction of the modulation pattern to be realized for all n parallel-connected pulse-controlled inverters. However, it is also possible for a partial-current-dependent correction of the modulation pattern to be realized such that one of the pulse-controlled inverters is operated in an uncorrected mode. Correction of the modulation pattern may be realized as a function of external limiting conditions, specifically, temperature, system damage, and/or different signal delay times.

The invention claimed is:

1. Method of operating multiple (n) parallel-connected pulse-controlled inverters (1,2), wherein
    the individual current(s) of the (n) pulse-controlled inverters (1,2), or of a number reduced by 1(n−1) of pulse-controlled inverters (1,2) is/are regulated, and
    each pulse-controlled inverter (1,2) includes first (IGBTT11, IGBTT21) and second (IGBTT14, IGBTT24) insulated gate bipolar transistors and first (D11, D21) and second (D14, D24) diodes each connected in parallel with a respective one of the first (IGBTT11, IGBTT21) and second (IGBTT14, IGBTT24) insulated gate bipolar transistors in the direction of reverse voltage (UD−) to forward voltage (UD+),
    the input variable of regulation is generated by the difference between the setpoint value and the actual value of the corresponding output current, and by the modulation pattern, and
    for each pulse-controlled inverter (1, 2),
    when the actual value of current (I11, I21) is greater than the setpoint value, a turn-on edge of the first transistor (T11, T21) and turn-off edge of the second transistor (T14, T24) are each delayed, a turn-off edge of the first transistor (T11, T21) and turn-on edge the second transistor (T14, T24) remaining undelayed,
    when the actual value of the current (I11, I21) is smaller than the setpoint value, the turn-on edge of the first transistor (T11, T21) and turn-off edge of the second transistor (T14, T24) are undelayed, with the turn-off edge of the first transistor (T11, T21) and turn-on edge of the second transistor (T14, T24) each being delayed, and
    when the actual value of the current (I11, I21) equals the setpoint value, the turn-on edges and turn-off edges of the first (T11, T21) and second (T14, T24) transistors all remain undelayed.

2. Method according to claim 1, wherein the individual currents from two pulse-controlled inverters (1, 2) are regulated.

3. Method according to claims claim 2, wherein the pulse-controlled inverters (1, 2) have the same output.

4. Method according to claim 3, wherein the total current is uniformly distributed among pulse-controlled inverters (1, 2) of the same output.

5. Method according to claim 2, wherein each pulse-controlled inverter (1, 2) is regulated separately, with each regulator having sensed currents to separately adjust each regulator.

6. Method according to claim 1, wherein the pulse-controlled inverters (1, 2) have the same output.

7. Method according to claim 6, wherein the total current is uniformly distributed among pulse-controlled inverters (1, 2) of the same output.

8. Method according to claim 7, wherein each pulse-controlled inverter (1, 2) is regulated separately, with each regulator having sensed currents to separately adjust each regulator.

9. Method according to claim 6, wherein each pulse-controlled inverter (1, 2) is regulated separately, with each regulator having sensed currents to separately adjust each regulator.

10. Method according to claim 1, wherein upon asymmetrical distribution of current, said two pulse-controlled inverters (1,2) have setpoint/actual-value deviations of opposite polarity.

11. Method according to claim 1, wherein when the actual value of the current (I11) in one (1) of the inverters (1, 2) is excessively larger than the actual value of the current (I21) in the other (2) of the inverters (1,2), different switching time points produce a voltage-time integral at respective output chokes (3, 6), resulting in a current change in the two chokes (3,6) in a direction of removing setpoint/actual value deviation, such that total current remains unchanged.

12. Method according to claim 1, wherein the actual values of current (I11, I21) are summed in a summing element (8), the resulting sum is sent to respective amplifiers (9, 10), where the sum is amplified by respective gain factors (K1, K2),
    output of each said amplifier (9, 10) is forwarded to a respective differentiating element (11, 13) in which difference (12, 14) between the amplifier output and actual current (I11, I21) is taken,
    both said differences (12, 14) are then fed to a regulator (15) to which a modulation pattern (16) is also supplied, and
    the regulator (15) generates control pulses for the transistors (T11, T14, T21, T24).

13. Method according to claim 1 wherein each pulse-controlled inverter is regulated separately, with each regulator having sensed currents to separately adjust each regulator.

14. Method according to claim 1, wherein the control edges of the power semiconductors (T11, T14, T21, T24) are shifted within the pulse-controlled inverter(s) (1, 2).

15. Method according to claim 1, wherein each phase of one, of multiple, or of all pulse-controlled inverters (1, 2) is regulated individually.

16. Method according to claim 1, wherein the gain factors (K1, K2) of regulation are dependent on external limiting conditions.

* * * * *